3,073,694
FERTILIZER COMPOSITION COMPRISING UREA
AND DITHIOCARBAMATES
Archibald M. Hyson, Newark, Del., assignor to E. I. du
Pont de Nemours and Company, Wilmington, Del.,
a corporation of Delaware
No Drawing. Filed Mar. 8, 1960, Ser. No. 13,454
3 Claims. (Cl. 71—30)

This invention relates to novel urea compositions having combined therewith a small amount of a urease inhibiting compound and to methods utilizing such compositions. More particularly, this invention relates to prilled, shotted or spheroidal urea fertilizers with a urease inhibiting amount of salts of alkyl and dialkyl dithiocarbamates.

When urea is added to soil as a fertilizer, either alone or in admixture with other fertilizer ingredients, the nitrogen in the urea is rapidly converted to ammonium carbonate or ammonia by the action of soil urease. Particularly when this enzymatic action takes place on or near the surface of soil possessing low exchange capacity or on organic debris on the soil surface, a significant portion of the urea nitrogen will be volatilized as ammonia. Such losses are of considerable economic importance to the user, and contribute to other serious disadvantages more fully explained below.

According to the present invention, it has been found that the action of soil urease, undesirable for the period that the urea remains on the soil surface, can be inhibited from its attack on urea in urea fertilizer compositions if there is incorporated in the urea fertilizer composition from about 3–8000 parts per million, and preferably 5–500 parts per million, by weight of the urea, a compound represented by the formula:

(1) 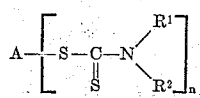

where A is selected from the group consisting of sodium, magnesium, potassium, calcium, manganese, iron, copper, nickel, zinc, ammonium, dimethyl ammonium, and diethyl ammonium; $R^1$ and $R^2$ can be the same or different and are selected from the group consisting of hydrogen and alkyl radicals of less than 3 carbons each; and $n$ is the valence of A; provided that at least one of $R^1$ and $R^2$ is other than hydrogen.

Illustrative of compounds within the scope of the above formula can be named the following:

Copper dimethyldithiocarbamate
Copper diethyldithiocarbamate
Ferric dimethyldithiocarbamate
Zinc dimethyldithiocarbamate
Magnesium dimethyldithiocarbamate
Calcium dimethyldithiocarbamate
Sodium dimethyldithiocarbamate
Sodium methyldithiocarbamate
Zinc methyldithiocarbamate
Nickel dimethyldithiocarbamate
Ammonium diethyldithiocarbamate
Ammonium dimethyldithiocarbamate
Dimethyl ammonium dimethyldithiocarbamate
Dimethyl ammonium diethyldithiocarbamate The compositions of this invention are composed primarily of urea and the 3–8000 parts per million by weight of the dithiocarbamate compound based upon the weight of the urea. In addition, other fertilizer additives can be used such as conditioning or anticaking agents, clays or other inert carrier materials, and other fertilizer materials. A particularly advantageous component is zinc, calcium or magnesium stearate. These adjuvants will usually constitute less than 5% by weight of the total composition and preferably less than 2%.

Preferably, the urea is in the form of a prill which can be produced in conventional manner such as by heating the water-urea product produced by reaction of ammonia and carbon dioxide to remove the water and to obtain molten urea, followed by prilling the molting urea by spraying into cool gases. The urease inhibitor compound according to this invention is then conveniently applied to the surface of the prills by any suitable means, such as by tumbling or simple admixture in the proper proportions. The prill will then have on its surface usually from 3 to 1000 parts per million of inhibitor based on the weight of the urea. Conveniently, the urease inhibiting compound is mixed with the conditioning agent, anticaking agent, dye and other additives prior to application to the prill.

The compositions of this invention are applied to soil, turf, cropland etc. in the same manner and for the same purposes that the urea fertilizer alone would be applied. The rate of application is preferably within the range from 50–200 pounds of urea per acre but more or less can be used with corresponding benefits. The prills are broadcast by hand or mechanical means, such as by drilling, and are suitable in both side and top dressing applications. The compositions are particularly useful in the amounts specified above in application to coastal Bermuda grass and tobacco cropland.

In addition to the advantage mentioned above, namely that the rate of nitrogen volatilization as ammonia is reduced appreciably, other significant advantages are obtained by the practice of the present invention. In prior art compositions containing urea, the rates of application have been limited because of the release of ammonia which causes a certain amount of damage to growing plants. This damage produces a "leaf-burn" and has restricted the use of such compositions for treatment of pastures, lawns and ornamental shrubbery.

Furthermore, it is possible that efficiency of feed utilization in ruminant animals will be improved by utilization of the compositions of this invention. In ruminant animals, bacteria present in the rumen produce urease and convert urea to ammonia. If the rate of conversion is too rapid, efficiency of feed utilization is reduced and the animal suffers. Thus the present invention allows better feed utilization as well as a higher concentration of urea in animal feed.

This invention will be better understood from the following examples which are given for purposes of illustration only:

*Example 1*

Copper dimethyldithiocarbamate in an amount of 0.25 gram is ground in a mortar with 10 grams of clay until a homogeneous mixture is obtained. This mixture is distributed on the surface of 500 grams of shotted urea by tumbling in a mechanical mixture. The urea composition thus prepared contains approximately 0.05 percent of the dithiocarbamate and 2.0% clay based on the urea.

*Example 2*

Urea powder in an amount of 98 parts by weight is admixed by thorough stirring with 0.2 part by weight of copper diethyldithiocarbamate, 2 parts by weight of zinc stearate, and a trace of green dye identified as Pontacyl Green to form a urease inhibiting fertilizer composition.

*Examples 3–16*

Examples 1 and 2 are repeated, substituting in place of the dithiocarbamate compounds of those examples, the compounds listed hereinbefore in varying amounts within and throughout the range of 3 to 8000 parts per million as described above.

Example 17

Example 1 is repeated except that, prior to application to the shotted urea, there is admixed with the copper dimethyldithiocarbamate and clay 1.6 grams of magnesium stearate and a trace of Pontacyl Green dye, with the prills coated as described in that example.

Example 18

The compositions of the preceding examples are applied by broadcasting to areas of tobacco cropland and coastal Bermuda grass at a rate of 25–500 lbs. per acre with outstanding beneficial results. Urea nitrogen loss as volatile ammonia is reduced significantly, evidencing a high stability of these compositions against the action of urease.

The invention claimed is:

1. A urea fertilizer composition comprising urea and from 3–8000 parts per million based on the weight of the urea, of a compound having the formula

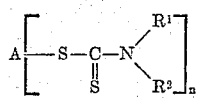

where A is selected from the group consisting of sodium, magnesium, potassium, calcium, manganese, iron, copper, nickel, zinc, ammonium, dimethyl ammonium, and diethyl ammonium; $R^1$ and $R^2$ are selected from the group consisting of hydrogen and alkyl radicals of less than 3 carbons each; and $n$ is the valence of A; provided that at least one of $R^1$ and $R^2$ is other than hydrogen.

2. Prilled urea having on its surface from 3–8000 parts per million by weight of a compound represented by the formula

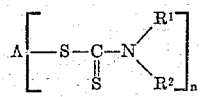

where A is selected from the group consisting of sodium, magnesium, potassium, calcium, manganese, iron, copper, zinc, nickel, ammonium, dimethyl ammonium, and diethyl ammonium; $R^1$ and $R^2$ are selected from the group consisting of hydrogen and alkyl radicals of less than 3 carbons each; and $n$ is the valence of A; provided that at least one of $R^1$ and $R^2$ is other than hydrogen.

3. The method of fertilizing soil comprising applying to the soil to be fertilized a urea composition comprising urea and from 3–8000 parts per million based on the weight of the urea, of a compound having the formula:

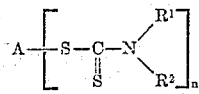

where A is selected from the group consisting of sodium, magnesium, potassium, calcium, manganese, iron, copper, nickel, zinc, ammonium, dimethyl ammonium, and diethyl ammonium; $R^1$ and $R^2$ each separately is selected from the group consisting of hydrogen and alkyl radicals of less than 3 carbons each; and $n$ is the valence of A; provided that at least one of $R^1$ and $R^2$ is other than hydrogen, in an amount to provide from 25–500 pounds of urea per acre treated.

References Cited in the file of this patent

UNITED STATES PATENTS

| | | |
|---|---|---|
| 2,255,027 | Keenen | Sept. 2, 1941 |
| 2,457,674 | Heuberger | Dec. 28, 1948 |
| 2,704,245 | Searle | Mar. 15, 1955 |
| 2,770,538 | Vierling | Nov. 13, 1956 |

FOREIGN PATENTS

| | | |
|---|---|---|
| 858,352 | Germany | Dec. 4, 1952 |

OTHER REFERENCES

Hanna: "Handbook of Agricultural Chemicals," 2nd edition, pages 94, 95, 107 and 108; pub. by Lester W. Hanna, Rt. 1, Box 210, Forest Grove, Oregon, 1958.